United States Patent
Grant et al.

(10) Patent No.: US 11,144,760 B2
(45) Date of Patent: Oct. 12, 2021

(54) AUGMENTED REALITY TAGGING OF NON-SMART ITEMS

(71) Applicant: International Business Machines Corporation, Armonk, NY (US)

(72) Inventors: Robert Huntington Grant, Atlanta, GA (US); Zachary A. Silverstein, Austin, TX (US); Vyacheslav Zheltonogov, Allen, TX (US); Juan C. Lopez, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/448,248

(22) Filed: Jun. 21, 2019

(65) Prior Publication Data

US 2020/0401802 A1 Dec. 24, 2020

(51) Int. Cl.

| | | |
|---|---|---|
| *G06K 9/00* | (2006.01) | |
| *G06F 16/58* | (2019.01) | |
| *H04W 4/029* | (2018.01) | |
| *G06T 19/00* | (2011.01) | |
| *H04W 4/021* | (2018.01) | |
| *G06T 7/70* | (2017.01) | |

(52) U.S. Cl.
CPC ..... *G06K 9/00671* (2013.01); *G06F 16/5866* (2019.01); *G06T 7/70* (2017.01); *G06T 19/006* (2013.01); *H04W 4/021* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 10,147,243 B2 | 12/2018 | Yamamoto et al. | |
| 10,373,387 B1 * | 8/2019 | Fields | G06Q 40/08 |
| 2007/0038944 A1 | 2/2007 | Carignano et al. | |
| 2007/0242131 A1 | 10/2007 | Sanz-Pastor et al. | |
| 2008/0163379 A1 | 7/2008 | Robinson et al. | |
| 2010/0103173 A1 | 4/2010 | Lee et al. | |
| 2010/0208033 A1 | 8/2010 | Edge et al. | |

(Continued)

FOREIGN PATENT DOCUMENTS

| | | |
|---|---|---|
| JP | 2004192623 A | 7/2004 |
| JP | 2007147642 A | 6/2007 |

OTHER PUBLICATIONS

Anonymous, "Identification of Smart Devices in Proximity to a User." IRcom Disclosure No. IPCOM000252057D, Publication Date: Dec. 14, 2017, 9 pgs.

(Continued)

*Primary Examiner* — Nurun N Flora
(74) *Attorney, Agent, or Firm* — Mark Bergner

(57) ABSTRACT

A computer-implemented system and method provide for a tagging user (TU) device that determines a first location of the TU device and receives, in the first location, a selection of a real-world object from a TU who views the object through the TU device. The TU device receives, from a TU, tagging information to attach to the object, and captures descriptive attributes of the object. The descriptive attributes and the tagging information associated with the first location are stored in a tagged object database.

16 Claims, 7 Drawing Sheets

(56) References Cited

U.S. PATENT DOCUMENTS

| | | | | |
|---|---|---|---|---|
| 2014/0362111 | A1* | 12/2014 | Kim | G06T 11/60 |
| | | | | 345/633 |
| 2017/0091953 | A1* | 3/2017 | Bleiweiss | G06T 7/246 |
| 2017/0280188 | A1* | 9/2017 | Mullins | H04N 21/242 |
| 2018/0276895 | A1* | 9/2018 | Hodge | G09G 5/003 |
| 2020/0090409 | A1* | 3/2020 | Fink | G06T 7/73 |

OTHER PUBLICATIONS

Dang Ha the Hien, "The Modern History of Object Recognition—Infographic," https://medium.com/@nikasa1889/the-modern-history-of-object-recognition-infographic-aea18517c318, Apr. 28, 2017, printed Feb. 20, 2019, 4 pgs.

Flatt et al., "A Context-Aware Assistance System for Maintenance Applications in Smart Factories based on Augmented Reality and Indoor Localization," 2015 IEEE 20th Conference on Emerging Technologies & Factory Automation (ETFA), Luxembourg, 2015, pp. 1-4.

Huo et al., "Scenariot: Spatially Mapping Smart Things Within Augmented Reality Scenes," https://www.youtube.com/watch?v=3lw-cSMb9EQ, published Apr. 21, 2018, printed Feb. 20, 2019, 2 pgs.

K. Huo, "Scenariot: Spatially Mapping Smart Things Within Augmented Reality Scenes." In Proceedings of the 2018 CHI Conference on Human Factors in Computing Systems (CHI '18). ACM, New York, Paper 219, 13 pages, 2018.

Mell et al., "The NIST Definition of Cloud Computing," Recommendations of the National Institute of Standards and Technology, U.S. Department of Commerce, Special Publication 800-145, Sep. 2011, 7 pgs.

Placenote,"Build AR apps that interact with the real word," Placenote | Persistent AR SDK, https://placenote.com, accessed Jan. 16, 2019, 7 pgs.

Spassova et al., "Beam-Its-Virtual Sticky Notes in the Real World", https://www.researchgate.net/publication/228968879, Adjunct Proc. Pervasive 2008, pp. 14-18, 2008, uploaded May 17, 2014.

Spatial Canvas, "Build, explore, and share augmented realities," https://www.spatialcanvas.com/, printed Feb. 20, 2019, 6 pgs.

Statista, "Forecast augmented (AR) and virtual reality (VR) market size worldwide from 2016 to 2022 (in billion U.S. dollars)," https://www.statista.com/statistics/591181/global-augmented-virtual-reality-market-size/, printed Feb. 20, 2019, 6 pgs.

Taggr, "Leave your mark on the universe," https://www.taggr.app/, printed Feb. 20, 2019, 5 pgs.

* cited by examiner

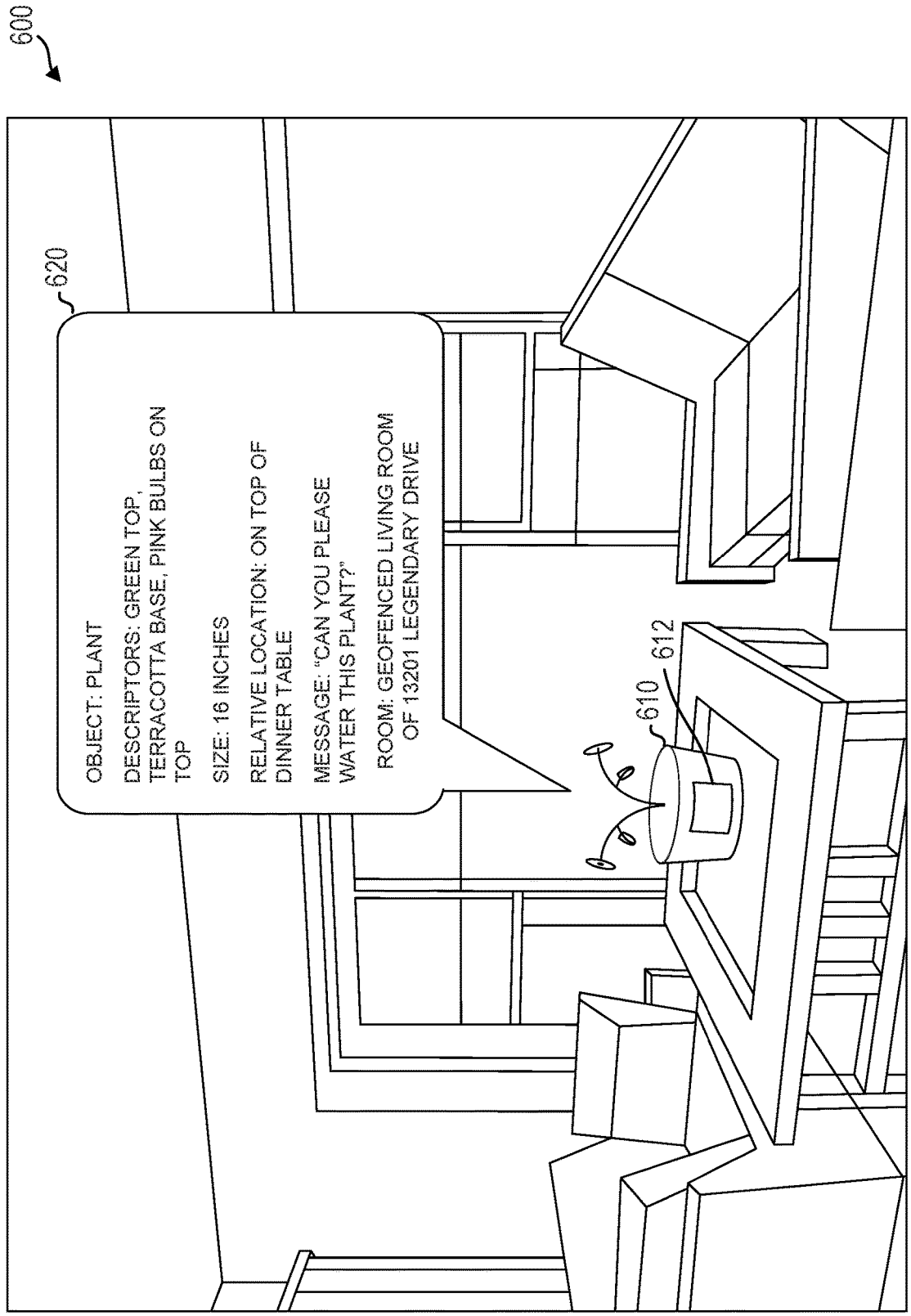

AUGMENTED REALITY TAGGING OF NON-SMART ITEMS

BACKGROUND

Disclosed herein is a system and related method for performing augmented reality tagging of non-smart items.

Augmented reality (AR) allows users who view their surroundings through a transparent display to access information about what is being viewed. Additional information may be presented to a user about a particular scene being viewed through an AR device, such as AR glasses, in the form of text or images. The AR device has some knowledge about its environment in order to determine what is being viewed and if it has access to information related to the current scene. Generally, the more information the AR device has access to, the better a scene being viewed may be augmented.

SUMMARY

According to one aspect disclosed herein, a computer-implemented method is provided for in a tagging mode of operation and with an augmented reality (AR) tagging user (TU) device, determining a first location of the TU device. The method further comprises receiving, in the first location, a selection of a real-world object from a tagging user who views the object through the TU device and receiving, from a TU, tagging information to attach to the object. The method further comprises capturing descriptive attributes of the object by the TU device, and storing the descriptive attributes and the tagging information associated with the first location in a tagged object database (TODB).

According to another aspect disclosed herein, an AR tagging system is provided, comprising a TU device processor of an augmented reality (AR) TU device. The TU device is configured to determine a first location of the TU device, and receive, in the first location, a selection of a real-world object from a tagging user who views the object through the TU device. The TU device is also configured to receive, from a TU, tagging information to attach to the object, capture descriptive attributes of the object by the TU device, and store the descriptive attributes and the tagging information associated with the first location in a tagged object database (TODB).

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings:

FIG. 6A is a pictorial diagram illustrating a room as it may be viewed through an AR device for a user tagging an object, according to some embodiments.

DETAILED DESCRIPTION

Figure 1:
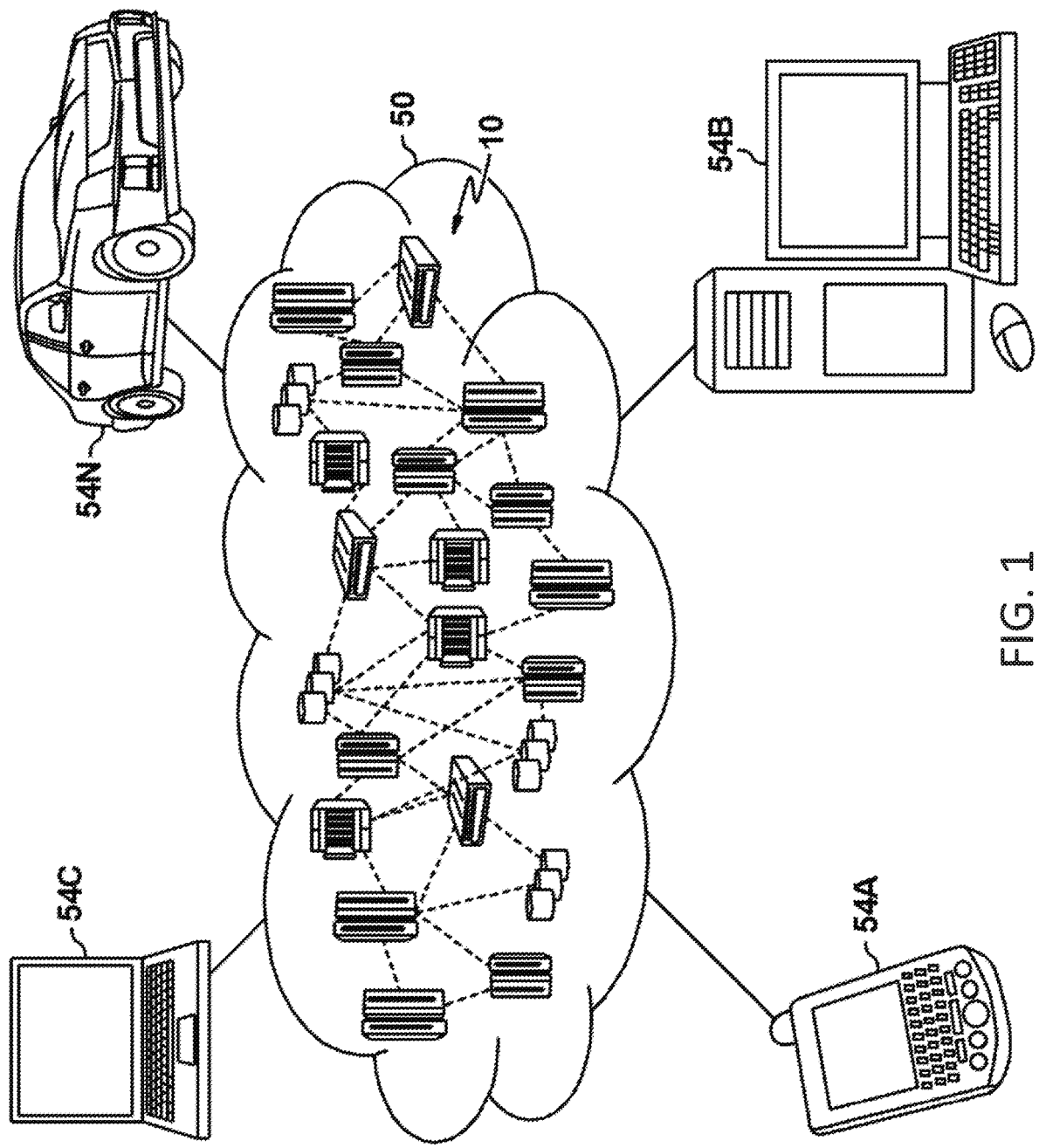
FIG. 1 depicts a cloud computing environment according to an embodiment of the present invention.

In order to increase the amount of information available to users of AR devices, it is advantageous to acquire information from other users who may be present at a particular location. Thus, AR systems may provide a user with an ability to provide tags at a location that may be viewed by others who are a part of the AR system and are present at that particular location. In an example scenario, a person who has eaten at a restaurant and had a good experience might provide a tag, such as a four-star rating and text that says, "the chicken wings were great". In such systems, the tags are typically location-based and dependent upon a view direction at the location. However, tagging a specific "dumb object" within a particular location that may be moved or viewed from a different perspective may present a more difficult challenge. In order to bring dumb objects into an IoT world, it may be necessary to associate additional information with the dumb objects to enhance their usefulness in a digital framework.

The ability to attach metadata flags and notations quickly and easily to non-smart items creates a significant technical advantage by increasing the connectivity of an environment and e.g., bring non-IoT objects into the IoT-enabled world. A practical application of this may be in industries where oversight or maintenance and upkeep is extremely important. For instance, the hospitality industry may use the system described herein to designate items for staff to specifically clean up or repair. Another possible use is in a laboratory where information may need to be associated with a current ongoing procedure for tracking. Database and geofencing information may generally be stored on (geofenced) site and/or on any number of remote servers, such as high availability cloud database platforms.

The following acronyms may be used below:
API application program interface
AR augmented reality
ARM advanced RISC machine
CD-ROM compact disc ROM CoD capacity on demand
CPU central processing unit
DPS data processing system
DVD digital versatile disk
EPROM erasable programmable read-only memory
FPGA field-programmable gate arrays
GNSS Global Navigation Satellite System
GPS Global Positioning System
HA high availability
IaaS infrastructure as a service
I/O input/output
ISA instruction-set-architecture
LAN local-area network
PaaS platform as a service
PDA personal digital assistant
PLA programmable logic arrays
RAM random access memory
RISC reduced instruction set computer
ROM read-only memory
RU reviewing user
SaaS software as a service
SLA service level agreement
SOI search optimization service
SRAM static random access memory
TODB tagged object database
TU tagging user
VR virtual reality
WAN wide-area network The following conventions, definitions, terms and/or expressions may be used herein.

The term "augmented reality" may refer to use of a device that overlays additional information on a scene at a particular location to a user. Although the term "virtual reality" typically refers to a scene viewable to a user that is entirely created by a computer, the term "augmented reality", as used herein, for the sake of conciseness, may include concepts associated with virtual reality as well.

The term "dumb object" may refer to an object that does not have a processor, communications electronics, and/or other self-identifying feature.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
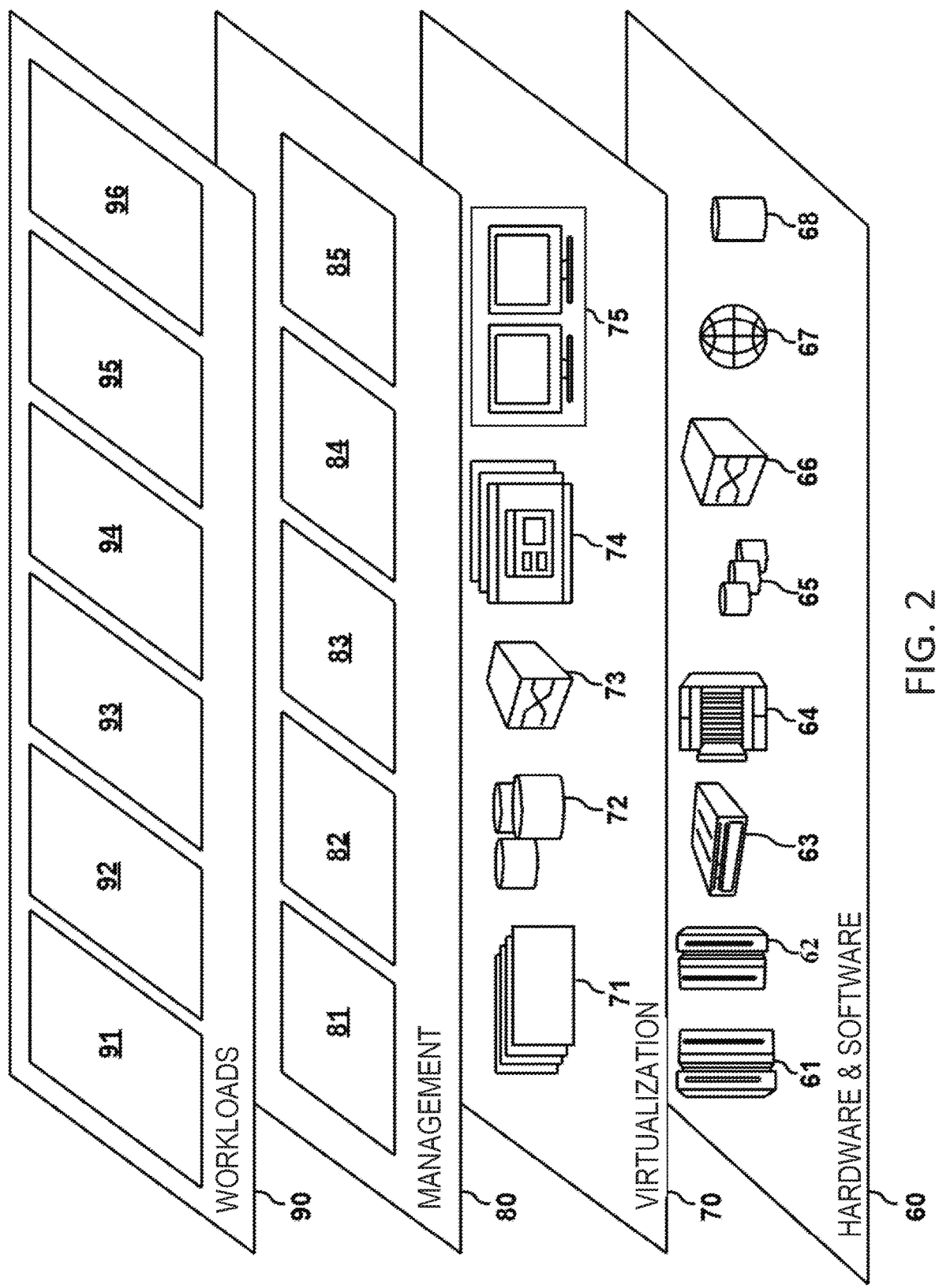
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System

Figure 3:
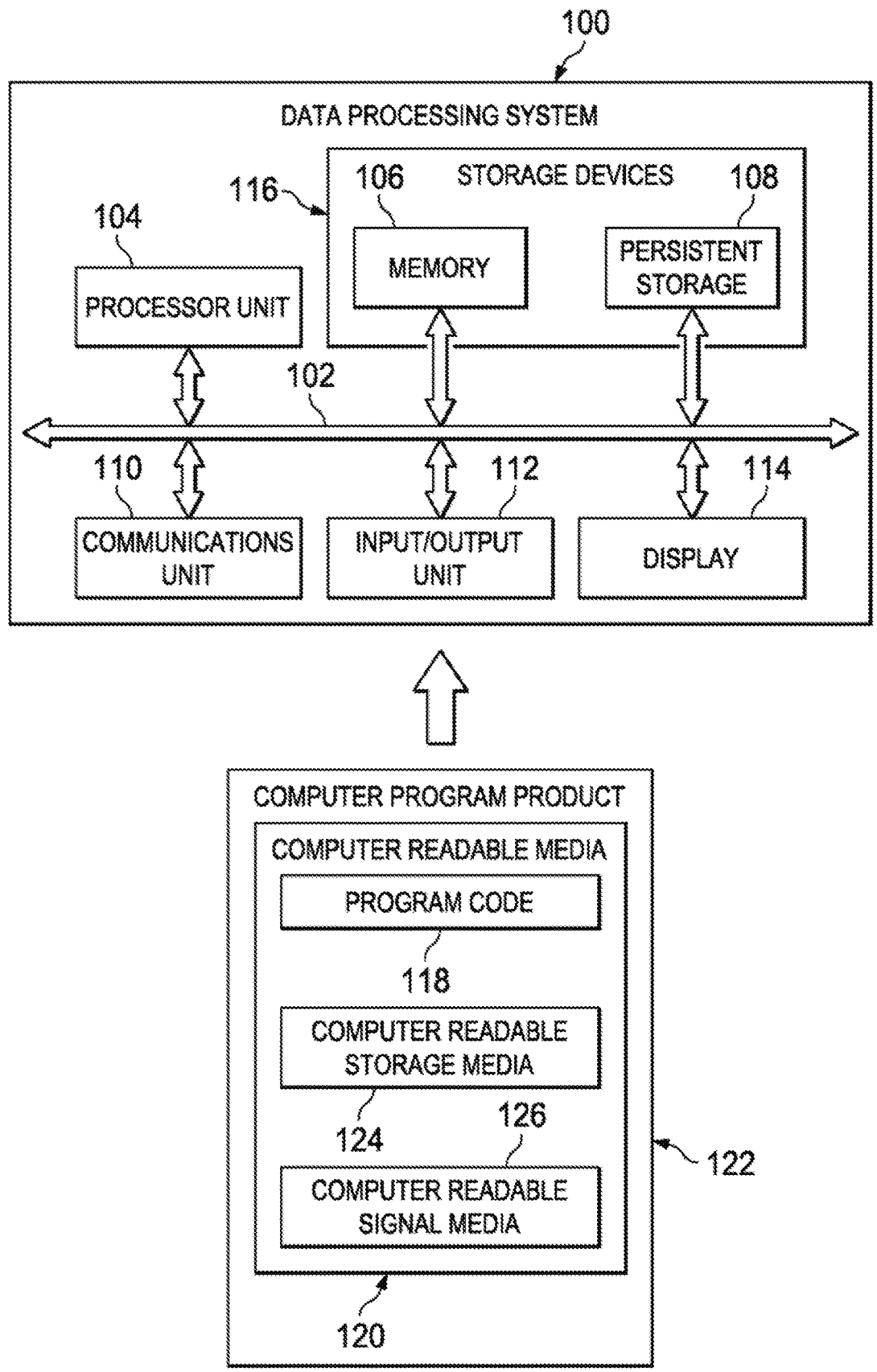
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1 may be varied from the illustrative examples shown.

Figure 4:
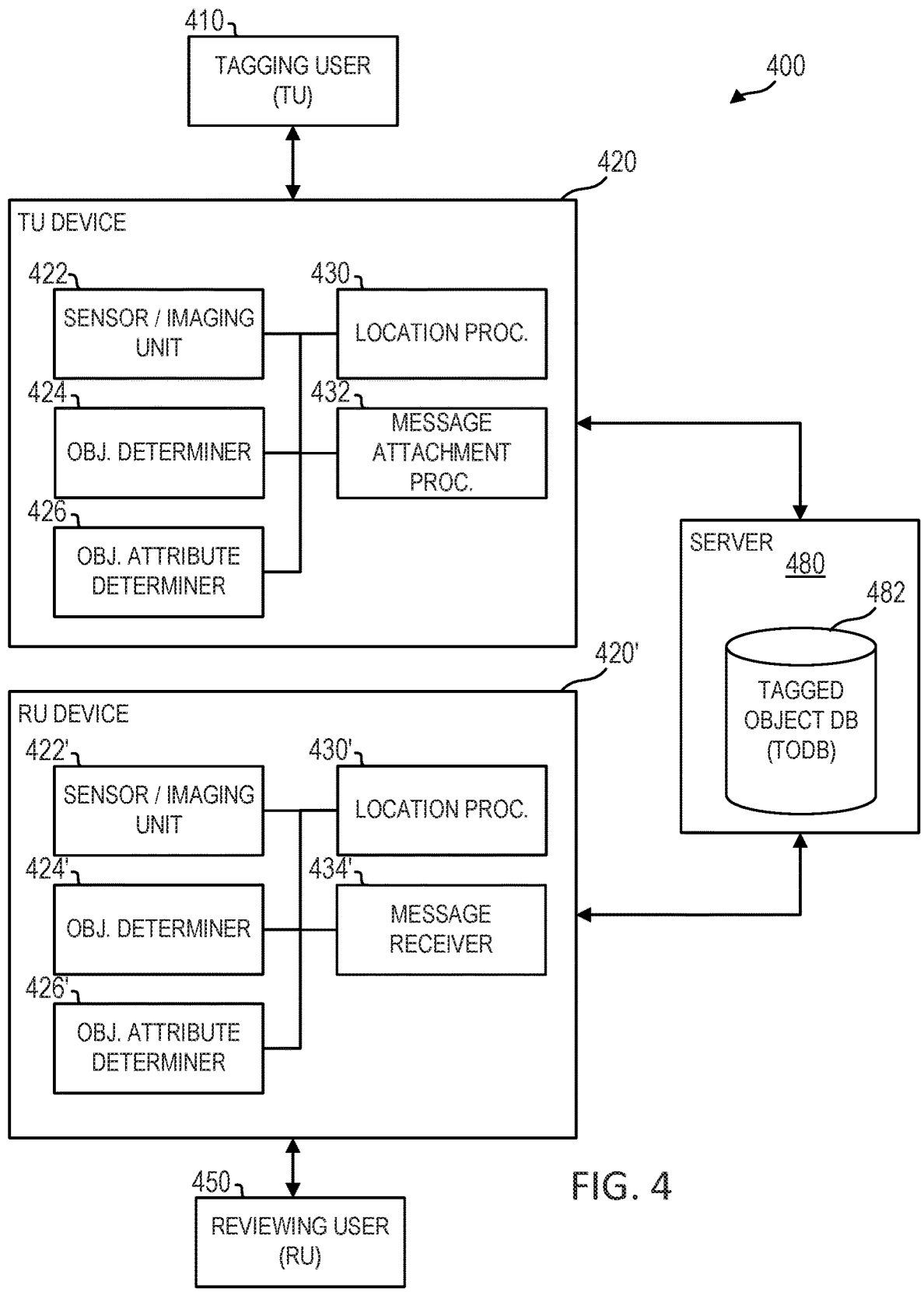
FIG. 4 is a block diagram of an AR tagging system, according to some embodiments.

FIG. 4 is a block diagram illustrating various components of an AR system 400. A tagging user (TU) 410 is a user who tags various real-world objects within a given location with information that may be available for a subsequent reviewing user (RU) 450 who enters the location at a subsequent time. Each user 410, 450 may have their own respective AR device—the TU device 420 for the TU 410 and the RU device 420' for the RU 450. The AR devices 420, 420' may be devices such as glasses, a smart phone, a wearable, or any entity with a camera and/or transparent overlay capable of display functions. Both the TU 410 and the RU 450, as described herein, may view the real-world objects via an AR view from the TU device 420 or the RU device 420'.

Although the TU device 420 and the RU device 420' are shown in FIG. 4 with slightly different features, they may be identically configured so that the roles of the users may be changed at will. In a use case presented here, a married couple, Zach and Jordan, share an apartment. Jordan may leave a message regarding an object in the apartment for Zach before leaving for work, in which case Jordan is the TU 410, and she may interact with her TU device 420 as the tagger. When Zach returns home from work and looks around the apartment, he becomes the RU 450, and operates his device initially as an RU device 420'. However, once he has read Jordan's note, he may wish to leave a note of his own for Jordan, in which case he transitions into the TU 410 and his device becomes the TU device 420 as he leaves his note. In turn, Jordan becomes the RU 450 and her device becomes the RU device 420' when she sees Zach's note to her.

Figure 6B:
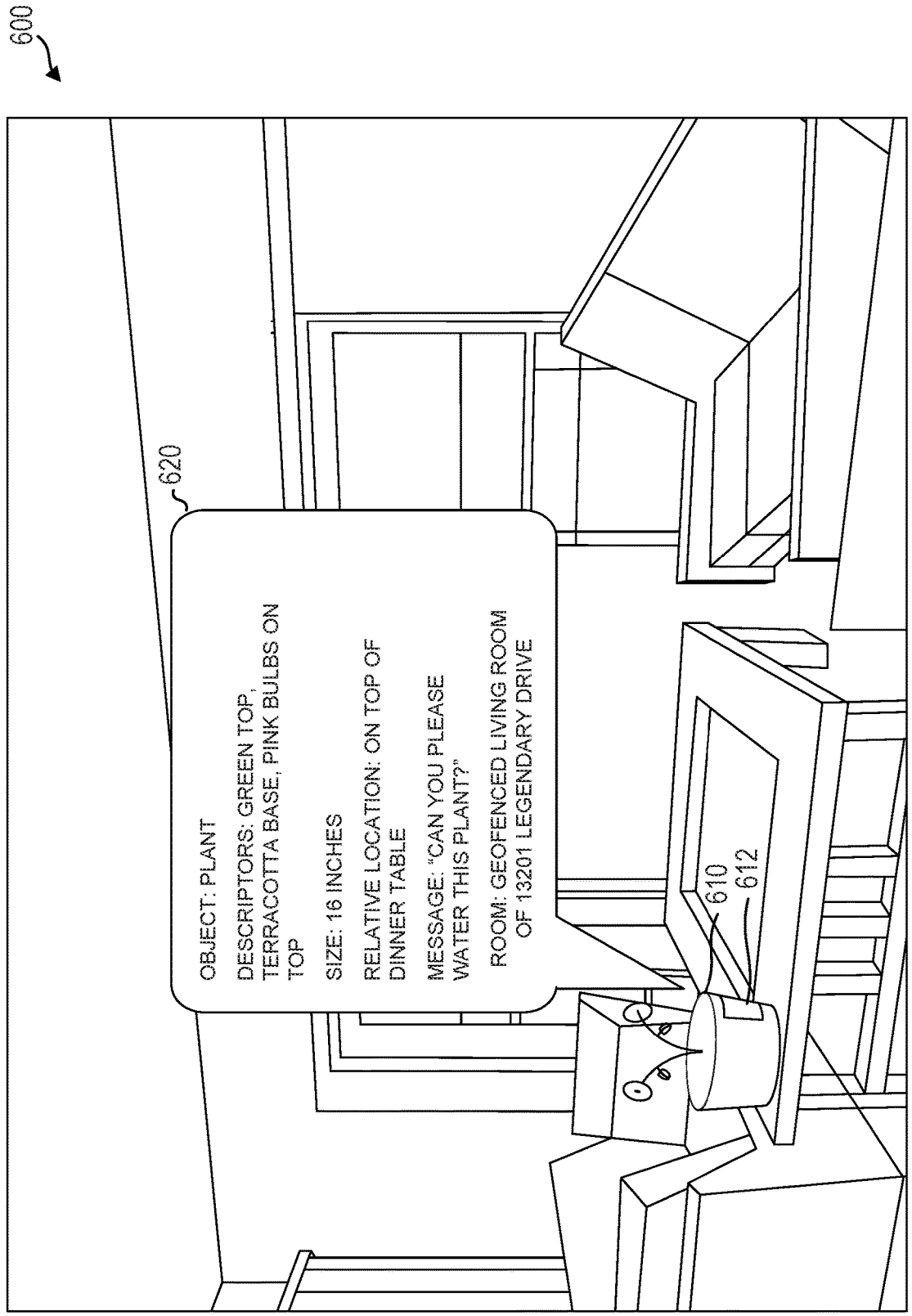
FIG. 6B is a pictorial diagram illustrating a room as it may be viewed through an AR device for a user viewing a tagged object, according to some embodiments.

Temporarily turning to FIGS. 6A and 6B that illustrate the use case, FIG. 6A is a pictorial view of a scene 600 in a room of the use case that will be discussed in more detail below. In this scene 600, Jordan, who is running late for work, wishes to leave a note for Zach to be sure to water the plant 610. The plant container has a graphic 612 attached to it. FIG. 6B is a pictorial view of the scene 600 as Zach encounters it later in the day when he returns to the apartment. The scene is the same, except that a cleaning person has moved and rotated the plant 610, and the graphic 612 is now only partially visible from this perspective.

Figure 5:
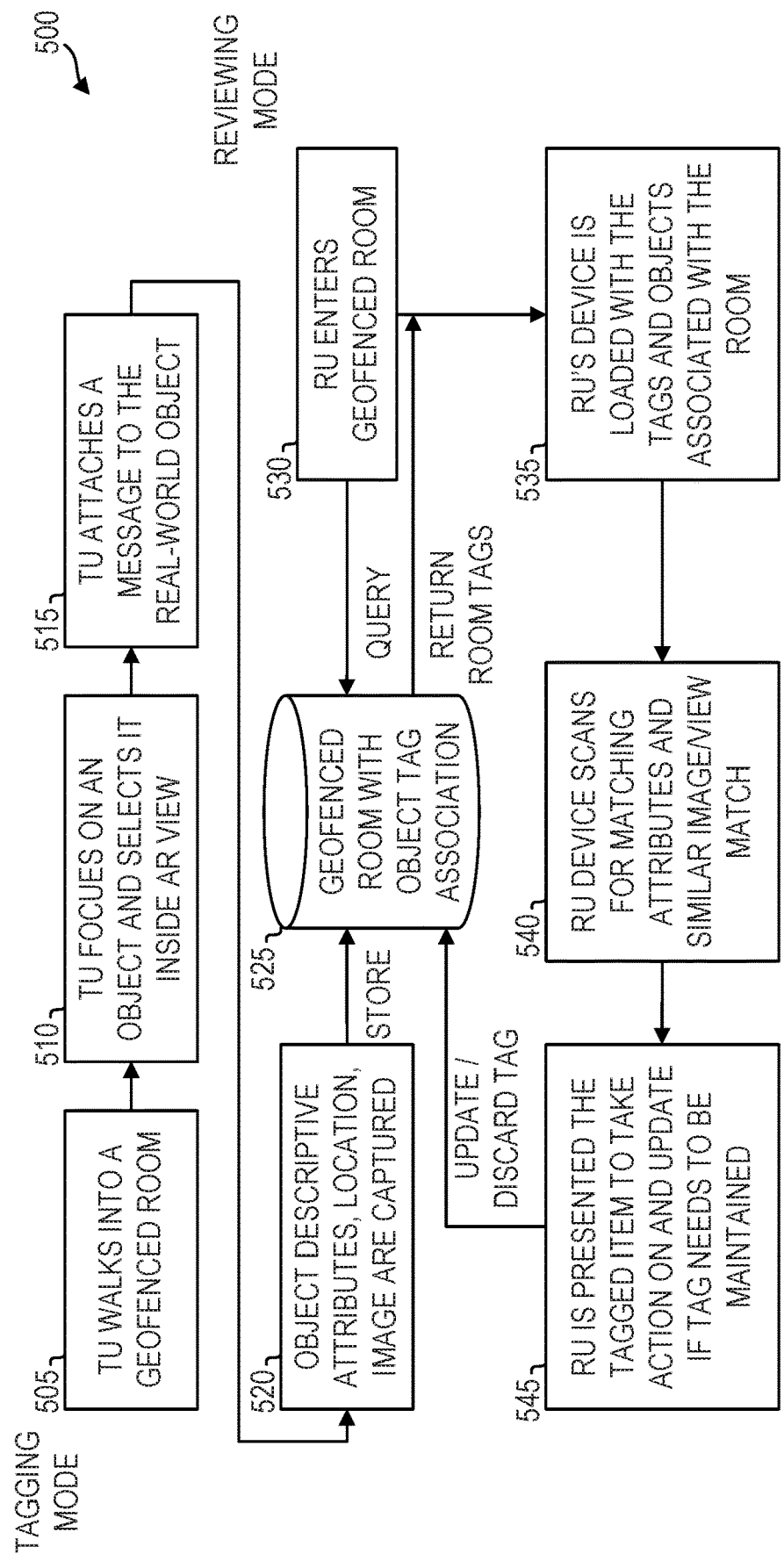
FIG. 5 is a combined flow and block diagram illustrating a process for using the AR tagging system, according to some embodiments.

With this brief illustration of the use case, turning back to FIG. 4, and referring to FIG. 5, which is an example process 500 that may be illustrated by the use case, Jordan puts on her AR glasses as the TU device 420 before heading off to work, walks into the geofenced living room of their apartment (operation 505) and, with her TU device 420 in a tagging mode of operation, scans the living room for anything that needs to be done that day, since she plans on working late. Each room in the apartment may be bounded by a geofence that has been established by Zach and Jordan or by some other entity. A precise location of Jordan's TU device 420 may be established by a location processor 430. The location processor 430 may determine the precise location using GPS, Wi-Fi, GNSS, cellular telephone signals, proximity sensors, image recognition, and the like. Thus, the location processor 430 may determine not only that Jordan is standing in the living room of their apartment, but where within the room she is located. The location processor 430 may further determine the orientation of Jordan's head based on input received from a sensor/imaging unit 422, and may further determine a direction that her eyes are focused in by imaging her pupil location relative to her eye sockets or head. The sensor/imaging unit 422 may be any type of camera or combination of cameras, sensors, and other mechanisms for obtaining an electronic image of the scene 600 being viewed.

As Jordan scans the living room for things that need to be done, she spots the plant 610 and remembers that she forgot to water it. Since she is running late for work, she decides to leave Zach a note to water the plant. In operation 510, Jordan focuses on the object, the plant 610, and selects it. The selecting of the object may be done in a number of ways, and may be assisted using an object determiner 424. Selection of an object may be done by the user in a number of ways. For example, staring at the object for some predetermined amount of time, e.g., two seconds, might signal to the TU device 420 that this object is to be selected. The object determiner 424 may combine information from the sensor/imaging unit 422 with information from the location processor 430, such as precise position, head orientation, and line of sight orientation, to determine specifically the object that is being focused upon. In some embodiments, the TU 410 may speak, and voice recognition and/or speech-to-text translation may be utilized so that the object may be recognized with more precision. For example, Jordan may look at the plant 610 and say "flower pot" or "plant" to assist the object determiner 424. This may help to distinguish between the plant as the object vs. the table with the plant as the object. Various mechanisms may be utilized for leaving the message, including using a drawing motion, writing, typing, speaking, etc. The information associated/bound with the object may include a text message, audio, voice and/or video information provided by the TU 410.

The object determiner 424 may utilize other ways to distinguish between different types of object where ambiguity of selection exists, such as the plant/table with plant situation described above. For example, the object determiner 424 may start with a largest detectable object in the TU's line of sight—in the use case example, the object determiner 424 may begin with the table with plant. In order to provide the TU 410 with feedback regarding object selection, the object determiner 424 may provide a highlighted outline of the tentatively selected object by way of a scene overlay in a display of the TU device 420. If the tentatively selected object is not the one intended by the TU 410, the TU may attempt to indicate the correct object to select. For example, when Jordan looks at the plant 410, and the object determiner 424 outlines the tentatively selected table with plant, Jordan may continue to stare at the plant for some predefined amount of time, thereby indicating to the object determiner 424 to focus on a smaller object, here, the plant 410. Jordan may also walk closer to the plant 410 while looking at it to indicate that this is the correct object. When the object determiner 424 focuses on the correct object, the TU 410 may indicate that this is so by providing a signal, such as a long blink (e.g., 0.5 sec.), or speaking a command, such as "select", use of a cursor or other controllable screen selector on the TU device 420, or by any other way of indicating a selection.

The object attribute determiner 426 may operate to collect additional object information or attributes about the object, once the object determiner 424 has determined the correct object. The object attribute determiner 426 may serve to collect as much additional information as possible about the object so that it may be more easily recognizable in the event the object is moved, changed, or presented from a different perspective. In some embodiments, the sensor/imaging unit 422 may collect additional information, and image recognition technology may be utilized to recognize further features of the object. In some implementations, the additional information may be requested from the TU 410. In the use case example, the object attribute determiner 426 may solicit Jordan (via text, audio, graphics, etc.) to capture additional image information, such as one or more images taken from different perspectives. This may allow the object to be located in the event the RU 450 views it from a different direction. In some embodiments, attributes about the object may be obtained from external sources, such as web sites, databases, and the like. The object attributes may be broken down into: 1) semantic attributes (e.g., plate, bowl, TV); 2) descriptor attributes (e.g., color, shape, size/dimensions, texture—such as, purple, roughly 2 feet long, etc.), 3) location attributes (absolute coordinates, relative coordinates, such as relative to a geofence or other objects/features corner of the room—such as by the TV, near the remote, etc.), 4) image attributes (an actual photograph or other image of the object taken future comparison or reference). This additional object information may include any other attribute of the object.

In some embodiments, the object attribute determiner 426 may access external sources to obtain further information about the object. For example, the object attribute determiner 426 may be able to determine from the graphic 612 on the container of the plant 610 that the plant was purchased at a local retailer. Armed with this information, the object determiner 424 may access an external information source, such as the retailer's web page, to acquire even more information about the plant 610 and its container, e.g., additional image data of the plant container from different angles or perspectives. Such additional data may then be used to assist the RU device 420' in subsequently identifying the object.

In operation 515, the TU 410 may provide information that allows the message attachment processor 432 to attach a message or any other information as tagging information, including the detected or obtained attribute information to that object. As can be seen in FIGS. 6A and 6B illustrating the use case, the attached information 620 may include the user message ("Can you please water this plant?") along with location information (e.g., absolute location information related to the geofenced area, and relative location information related to the object's position with respect to other objects in the area) and attributes of the object (object name, size, descriptors, and the like). Although FIG. 5 shows operation 520 following operation 515, the order of these operations may be reversed as well. The information from the TU 410, in some embodiments, may be entered by the TU 410 speaking and the spoken message being translated into text by a speech-to-text translator. In some embodiments, the user may type the message in using their TU device 420. An actual image of the object may be collected and associated with the information that is stored with the object and presented later to the RU 450.

The information collected that is related to the object may be stored in a tagged object database (TODB) 482 that may be located, e.g., on a server 480. The server 480 may be a local server located near the object or in a geofenced region of the object. In this case, IoT technology may be utilized in the collection of and access to the object. The server 480 may also be a remote server and make use of, e.g., cloud technology for the storage of tagged object information. FIG. 5 shows the TODB 482 grouped as a geofenced room with object tag associations 525. The information items stored in the TODB 482 may be provided with access control so only certain users are permitted to see them. For example, the message to water the plant may be tagged by Jordan so that only Zach can see it. In some embodiments, access control may be provided for the individual items of data associated with an object. For example, Jordan may tag the plant 610 with a message to water it, but may simply make a personal note to herself in a tag that she should purchase additional fertilizer for the plant 610—in this way, Zach may be only presented with Jordan's additional information that she intends for him to see.

The tagged object information may furthermore contain a duration element to each tagged information item. This duration element may, in some embodiments, define an actual time that the tagged information item is associated with the object. The actual time may be absolute (Jun. 1, 2019 to Jun. 30, 2019) or relative (for five days from the tag creation date). Or the duration may be event-based. In the use case example, once Zach waters the plant 610 and an indication of such activity is provided to the system, Jordan's message about watering the plant 610 attached to the plant is no longer necessary, and this message tag may be removed from the TODB 482.

Turning to operation 530, an RU 450 enters an area, such as a geofenced area, containing objects that have been tagged. In the use case, this may be Zach entering the living room in which the plant 610 was tagged by Jordan. The RU device 420' may contain similar elements to the TU device 420 described above, and the description of these elements is not repeated here. In this situation, the RU device 420' may be in a reviewing mode of operation. The location processor 430' of the RU device 420' may detect entry into the geofenced area of the living room, in the use case, and the RU device 420' may access the TODB 482 on the server 480 to obtain information on tagged objects within the geofenced area.

Although geofence entry may, in some embodiments, be one retrieval trigger that causes the RU device 420' to access object information for objects within the geofence, other triggers may, in some embodiments, be designated for accessing and/or displaying object information to the RU 450. These triggers may include a distance between the RU 450 and the object. Such a distance may be predefined and may vary based on an object size. This distance may also be provided with the stored object attributes. For example, Jordan may indicate that the message to water the plant 610 should only be shown when Zach is within ten feet of the plant 610. In this way, an overload of information presented to the RU 450 may be prevented. In some embodiments, an inter-relationship between objects and locations may be established and stored in the TODB 482. For example, the message attached to an object need not be triggered by an aspect of, or relationship between, the RU 450 and the object itself (e.g., RU 450 distance from the plant 610), but may be triggered with respect to another object or its attributes. In the use case example, the trigger to display a message to water the plant 610 may be based on the RU's distance from the sink or a watering can, as opposed to the plant 610 itself. By applying this tagging on multiple objects and defining these types of interrelationships, dumb objects may, in effect, become smart objects in that the database and tags may carry the objects and their relationships to one another that are accessible to one or more RUs.

In operation 535, the RU device 420' may be loaded with objects and respective tags contained within the geofenced area from the TODB 482, based on a detected position of the RU device 420', as detected by the location processor 430'. Next, in operation 540, the RU device 420' may scan for objects within the geofenced area using its sensor/imaging unit 422'. The object determiner 424' and object attribute determiner 426' may operate as described above with respect to the TU device. Tagged objects within the TODB 482 may be located and the attributes of each object may be obtained by the RU device 420'. In the use case, the imaging unit 422' identifies the plant 610 as illustrated in FIG. 6B. As noted previously, however, the plant 610 has been moved on the table and rotated by the cleaning person so that only a part of the graphic 612 is seen. Nonetheless, the RU device 420' is able to make a positive object determination using the object determiner 424' and the object attribute determiner 426' to identify the object as stored in the TODB 482.

In some implementations, a "match" of the detected object by the RU device 420' may be made according to some predefined degree of certainty or a predefined matching criteria. Known matching algorithms may be implemented that perform a determination of a degree of matching between the object (or its descriptive/captured attributes) sensed by the RU device 420' and the object (or its descriptive/captured attributes) for which the attributes and message are attached. In the use case, even though the graphic 612 was rotated, and cannot be completely seen in FIG. 6B, when compared with the scene 600 in FIG. 6A, a match may be made, e.g., with a 95% certainty, which may be above a predefined threshold of 90%, and thus constitute a match for the object that was the subject of the message left by the TU 410. Any of the determined attributes may be brought into the analysis to determine a matching certainty. An image of the object stored in the TODB 482 may be presented to the RU 450. In some embodiments, such an image may be presented every time the object determiner 424' determines an object, and in some embodiments, such an image may only be presented when there is some threshold level of uncertainty associated with the object recognition.

With the match by the RU device 420' of the particular object corresponding to an object stored in the TODB 482, in operation 545, the RU 450 may be presented with a text or graphic overlay of the message and possibly other information associated with the object (in the use case, the plant 610) by a message receiver 434'. This other information may include some or all of the additional information associated with the object. The RU 450 may switch roles with the TU 410 and add their own tagged information related to the object. In the use case, Zach may go ahead and water the plant 610, and then leave a message for Jordan using the procedure described above indicating, e.g., "I added two cups of water to the flowers. Is that enough?". One or more of the original tags associated by the object may be updated or removed, as described above.

In some embodiments, the tagging mode of operation and the reviewing mode of operation may occur at the same time, or these modes of operation may occur separately at different points in time. Operation of each mode may be determined by a user providing an indication (e.g., via a switch, voice command, or by using any form of selection mechanism) of which mode to operate in or both modes to operate in.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer.

What is claimed is:

1. A computer-implemented method for tagging and retrieving objects, the method comprising:
   in a tagging mode of operation and with an augmented reality (AR) tagging user (TU) device:
      determining a first location of the TU device;
      receiving, in the first location, a selection of a real-world object from a TU who views a first image of the object through the TU device;
      receiving, from the TU, tagging information to attach to the object;
      capturing descriptive attributes of the object by the TU device; and
      storing the descriptive attributes and the tagging information associated with the first location in a tagged object database (TODB);
   wherein:
      the capturing of the descriptive attributes of the object by the TU device comprises, after the object has been identified: a) soliciting the TU to capture additional information in the form of one or more images taken from a different perspective; b) receiving image information from an imaging device of the TU device subsequent to the first image; and c) collecting additional object information or attributes about the object from the image information; and
      the tagging information comprises a duration element identifying a time that the tagging information is associated with the object;
   the method further comprising:

storing the additional object information or attributes in the TODB;

in a reviewing mode of operation and with an AR reviewing user (RU) device:
determining that the RU device is at the first location;
determining that the object is at the first location;
receiving the tagging information associated with the object that is stored in the TODB based on a retrieval trigger that is a detected distance between another object that differs from the object; and
displaying, on a display of the RU device, information associated with the received tagging information.

2. The method of claim 1, wherein the descriptive attributes comprise the following attributes: semantic attributes, descriptor attributes, location attributes, and image attributes.

3. The method of claim 1, wherein the first location is a geofence defining a bounded area.

4. The method of claim 1, wherein the TU device is AR glasses.

5. The method of claim 1, wherein the tagging information is selected from the group consisting of: message information, voice information, and video information.

6. The method of claim 1, further comprising accessing additional information associated with the object from external sources.

7. The method of claim 1, wherein:
the retrieval trigger is a detected distance between the object and the RU device; and
the detected distance is dependent upon a size of the object.

8. The method of claim 1, wherein the determining that the object is at the first location comprises:
scanning the first location;
locating the object as it is viewed through a display of the RU device;
capturing the descriptive attributes of the object by the RU device; and
matching the captured descriptive attributes of the object with the descriptive attributes of the object stored in the TODB that meets a predefined matching criteria.

9. The method of claim 1, further comprising:
modifying the tagging information of the object stored in the TODB subsequent to the receiving of the tagging information.

10. The method of claim 1, wherein the TU device and the RU device are a same device.

11. An augmented reality (AR) tagging system, comprising:
a tagging user (TU) device processor of an augmented reality (AR) TU device configured to:
determine a first location of the TU device;
receive, in the first location, a selection of a real-world object from a TU who views a first image of the object through the TU device;
receive, from the TU, tagging information to attach to the object;
capture descriptive attributes of the object by the TU device; and
store the descriptive attributes and the tagging information associated with the first location in a tagged object database (TODB);
wherein:
the capturing of the descriptive attributes of the object by the TU device comprises, after the object has been identified: a) soliciting the TU to capture additional information in the form of one or more images taken from a different perspective; b) receiving image information from an imaging device of the TU device subsequent to the first image; and c) collecting additional object information or attributes about the object from the image information; and
the tagging information comprises a duration element identifying a time that the tagging information is associated with the object;
the TU device being further configured to store the additional object information or attributes in the TODB;
in a reviewing mode of operation and with an AR reviewing user (RU) device:
determine that the RU device is at the first location;
determine that the object is at the first location;
receive the tagging information associated with the object that is stored in the TODB based on a retrieval trigger that is a detected distance between another object that differs from the object; and
display, on a display of the RU device, information associated with the received tagging information.

12. The system according to claim 11, wherein:
the descriptive attributes comprise the following attributes: semantic attributes, descriptor attributes, location attributes, and image attributes;
the first location is a geofence defining a bounded area;
the TU device is AR glasses worn by the TU;
the capturing of the descriptive attributes of the object comprises receiving image information from an imaging device of the TU device; and
the tagging information is selected from the group consisting of: message information, voice information, and video information.

13. The system according to claim 11, wherein the RU device processor is further configured to, in the determination that the object is at the first location:
scan the first location;
locate the object as it is viewed through a display of the RU device;
capture the descriptive attributes of the object by the RU device; and
match the captured descriptive attributes of the object with the descriptive attributes of the object stored in the TODB that meets a predefined matching criteria.

14. The system according to claim 11, wherein the RU device processor is further configured to modify the tagging information of the object stored in the TODB subsequent to the receiving of the tagging information.

15. A computer program product for an augmented reality (AR) tagging system, the computer program product comprising a computer readable storage medium having computer-readable program code embodied therewith to, when executed on a tagging user (TU) device processor of the TU device:
determine a first location of the TU device;
receive, in the first location, a selection of a real-world object from a TU who views a first image of the object through the TU device;
receive, from the TU, tagging information to attach to the object;
capture descriptive attributes of the object by the TU device; and
store the descriptive attributes and the tagging information associated with the first location in a tagged object database (TODB);

wherein:
the capturing of the descriptive attributes of the object by the TU device comprises, after the object has been identified: a) soliciting the TU to capture additional information in the form of one or more images taken from a different perspective; b) receiving image information from an imaging device of the TU device subsequent to the first image; and c) collecting additional object information or attributes about the object from the image information; and
the tagging information comprises a duration element identifying a time that the tagging information is associated with the object;
the program code being further configured for storing the additional object information or attributes in the TODB;
in a reviewing mode of operation and with an AR reviewing user (RU) device:
determine that the RU device is at the first location;
determine that the object is at the first location;
receive the tagging information associated with the object that is stored in the TODB based on a retrieval trigger that is a detected distance between another object that differs from the object; and
display, on a display of the RU device, information associated with the received tagging information.

16. The method of claim 1, wherein the receiving of the selection comprises:
receiving stare information for the real-world object for a first amount of time and selecting the real-world object responsive thereto; and
receiving stare information for the real-world object for a second predefined amount of time and selecting a sub-object of the real-world object responsive thereto.

\* \* \* \* \*